United States Patent Office 2,713,660
Patented July 19, 1955

2,713,660

ELECTRIC GENERATOR SYSTEM FOR SPEED INDICATORS

Sidney Davis, Brooklyn, N. Y., assignor to American Bosch Arma Corporation

Application April 5, 1951, Serial No. 219,417

2 Claims. (Cl. 322—96)

The present invention relates to speed indicators and has special reference to means for improving the accuracy of tachometer generators.

The armature of a conventional tachometer-generator is driven by the shaft whose speed is to be measured, and produces at the tachometer output terminals a unidirectional voltage which is proportional to the speed of the shaft. In many cases the voltage gradients for opposite directions of rotation may differ and this defect becomes serious where reasonable precision is desired or where the tachometer output is used as a part of a computing device.

The present invention equalizes the voltage gradients by inserting a unilateral resistor between the tachometer and the load. In a preferred embodiment of this invention a fixed series resistor is connected between the generator and the load and a variable resistor and rectifier are connected across the load terminals.

By proper adjustment of the variable resistor and proper choice of the polarity of the rectifier the voltage gradients at the load may be equalized for both directions of rotation.

For a more complete understanding of this invention, reference may be had to the accompanying drawing, which is a schematic wiring diagram of the preferred embodiment.

With reference to the figure, numeral 10 designates generally a conventional tachometer-generator, the armature 11 of which is driven by the shaft 12 whose rotational velocity is to be determined. The armature 11 is supported by frame 13 and rotates within the magnetic field provided by permanent magnets 14. Brushes 15 cooperate with the commutator 16 to produce a unidirectional voltage across brushes 15 proportional in magnitude to the rotational velocity of armature 11. In most cases, however, a difference in the voltage gradient i. e. the ratio of voltage output to speed, exists for the opposite directions of rotation, hereafter called the plus and minus rotations.

In order to equalize the voltage gradients a network 17 which is shown within the dotted line 17a is connected between the brushes 15 of tachometer 10 and the load 18 which could be any device requiring voltage proportional to speed and may be a voltmeter calibrated to read speed of shaft 12, for example, or the input to a computing circuit. The load 18 is preferably of high impedance to minimize the current taken by the load.

The network 17 is preferably an L type network in which the series arm is a fixed resistor 19 interposed in line 22 and the shunting arm contains a variable resistor 20 and a rectifying device 21 connected to output lines 22 and 23 across the load 18.

The operation of the invention may be seen by assuming, for example, that the voltage gradient for plus rotation of armature 11 is greater than the voltage gradient for minus rotation. This can be determined by use of a voltmeter. In order to equalize the voltage gradients across the load 18, the voltage drop across resistor 19 must be increased for a plus rotation of armature 11 over that due to the greater induced voltage at brushes 15. Therefore, the polarity of rectifier 21 is such that current flows through the resistor 20 only during plus rotation of armature 11. The magnitude of the change in voltage drop across resistor 19 at any speed for opposite directions of rotation is controllable by the resistor 20 which is adjusted until the voltage across load 18 is equal in magnitude for either plus or minus rotation for the same speed of armature 11.

If it is found that the resistance of armature 11 is sufficiently large to provide the correction as described, when used as the series arm resistance of network 17, the resistor 19 may be omitted.

Although only one circuit has been illustrated and described, other arrangements which are essentially equal to the present will become evident to those versed in the art. For example, the external series resistor 19 may be shunted by the proper valued unilateral resistor to accomplish a similar correction.

From the foregoing it will be seen that I have provided relatively simple, efficient and economical means for obtaining all of the objects and advantages of the invention.

I claim:

1. In a device of the character described, a tachometer generator of the type developing a voltage which is a measure of its driven speed, said generator having a constant magnetic field and an armature rotatable in either direction mounted in said field, a load electrically connected in a circuit with the said armature, a network comprising resistance and a rectifier in series with each other connected across said load, whereby the voltage across the load will have the same value for either direction of rotation at any one speed.

2. The device of claim 1 in which a fixed resistance is in series with the load on the generator side of said network so as to receive the full flow of current regardless of the direction of rotation of said armature.

References Cited in the file of this patent

UNITED STATES PATENTS

| | | |
|---|---|---|
| 1,096,942 | Owens | May 19, 1914 |
| 1,816,748 | Romain | July 28, 1931 |
| 2,076,962 | O'Hagan | Apr. 13, 1937 |
| 2,284,423 | Hansell | May 26, 1942 |

July 19, 1955  W. L. R. HENDERSON  2,713,666
REACTOR
Filed Feb. 19, 1954
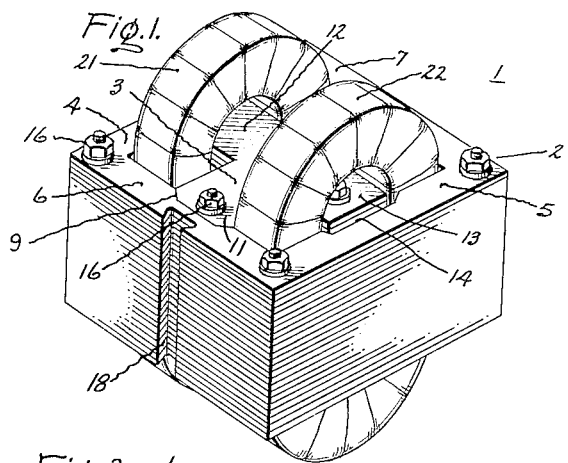
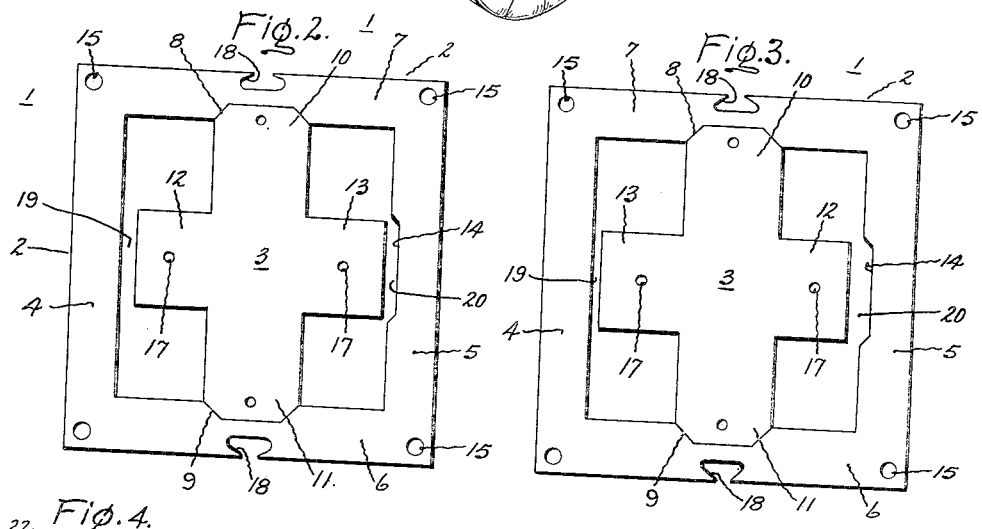
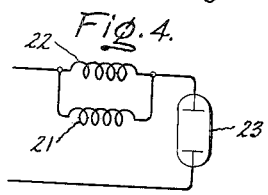
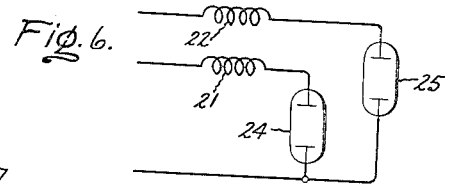
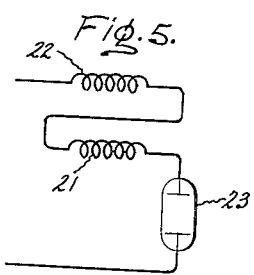
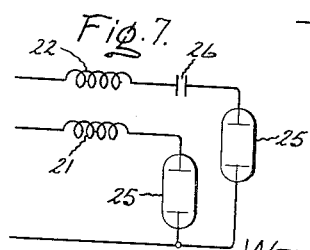
INVENTOR.
Wayne L. Henderson,
BY
Robert G. Irish
His Attorney.